UNITED STATES PATENT OFFICE.

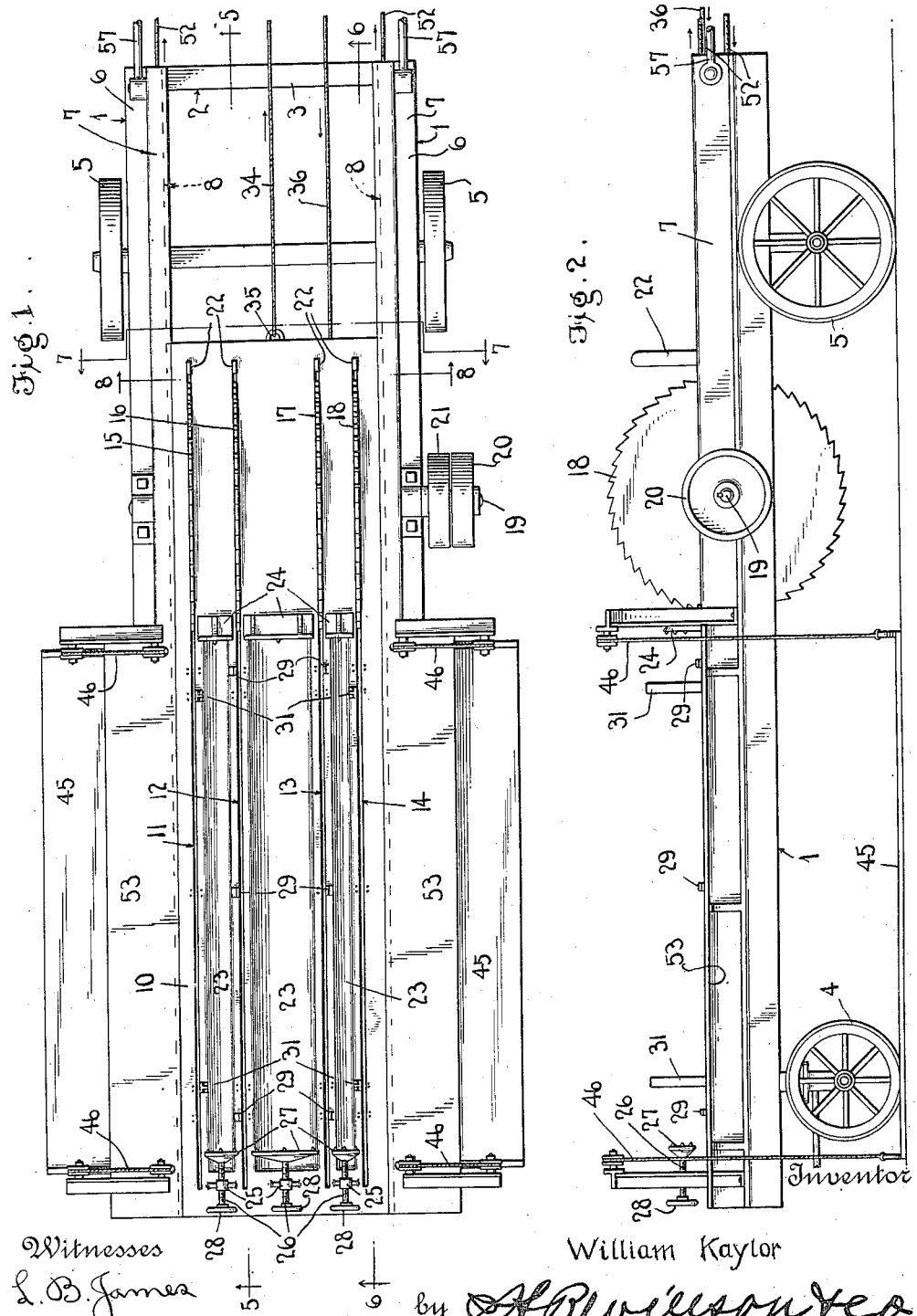

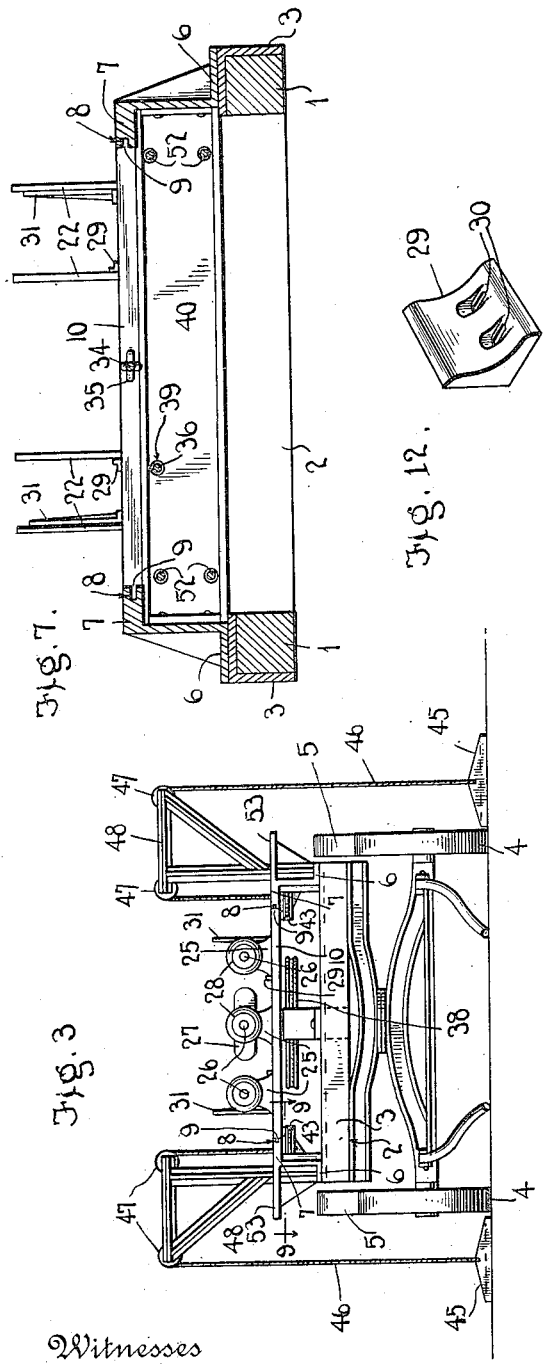
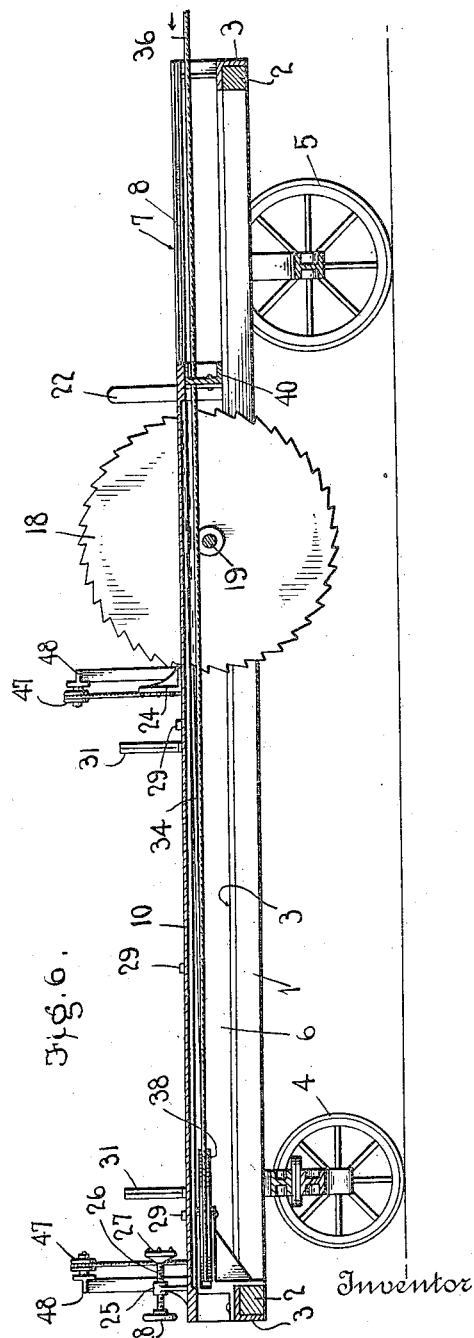

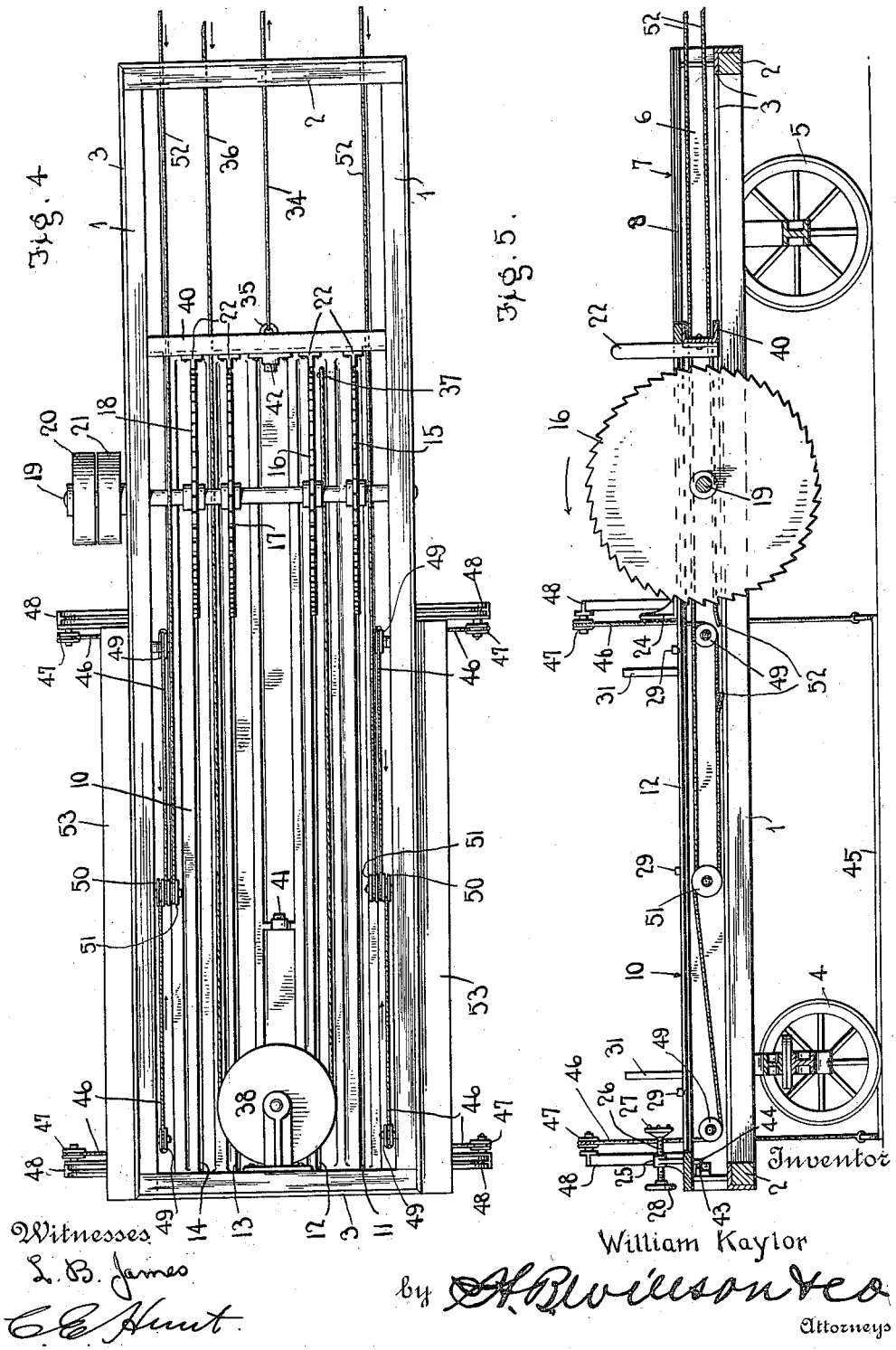

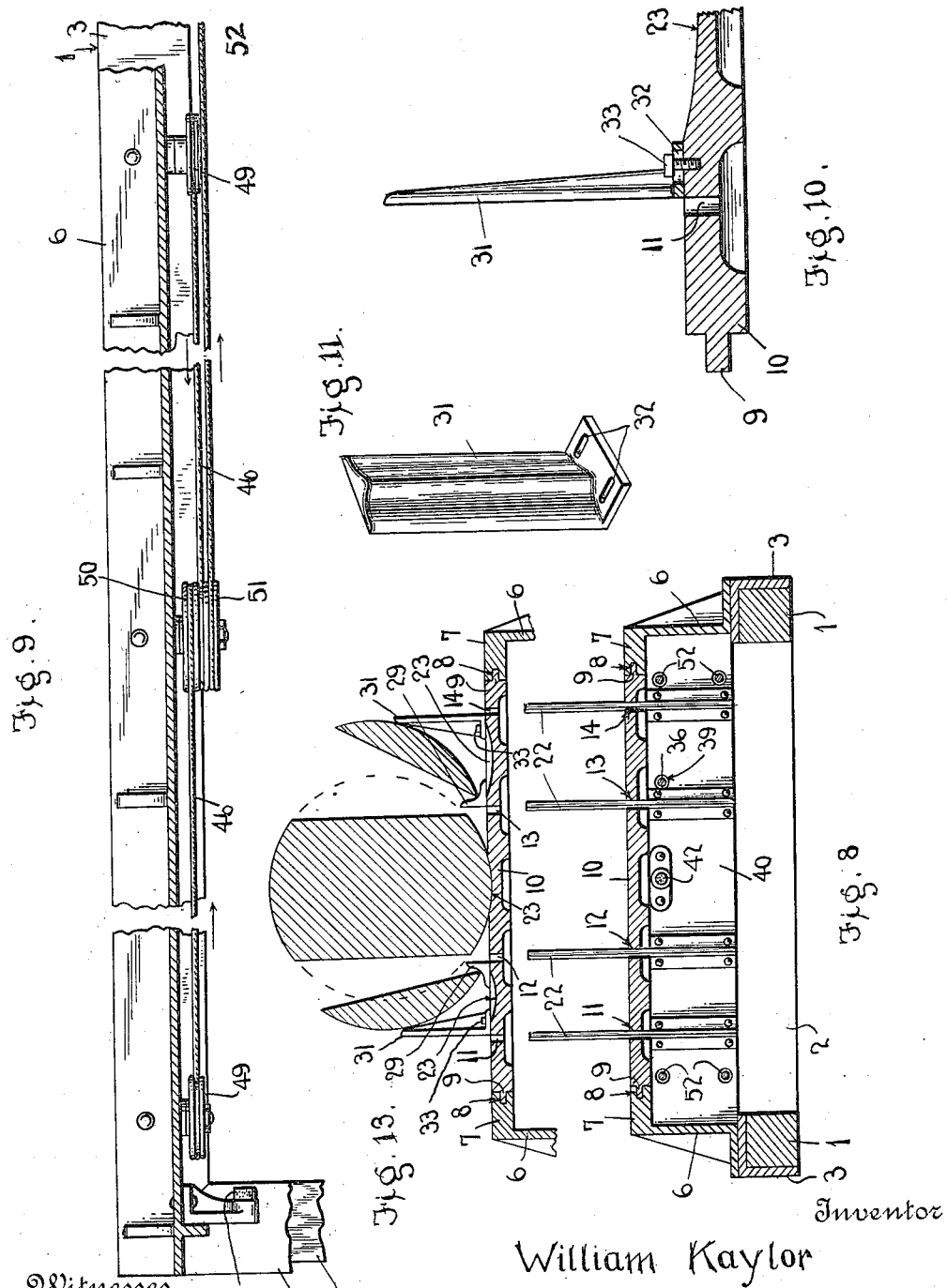

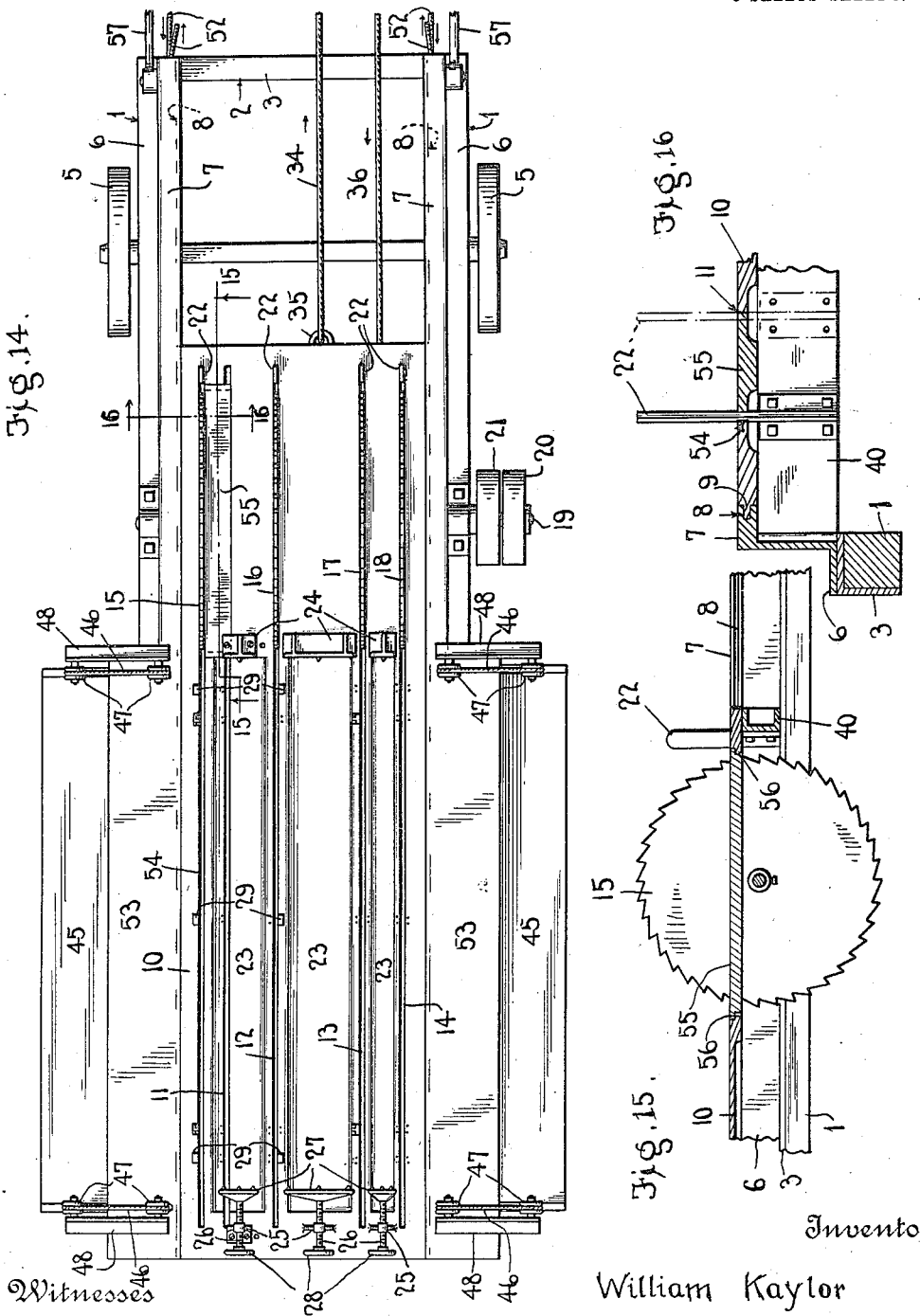

WILLIAM KAYLOR, OF MUSKOGEE, OKLAHOMA, ASSIGNOR TO WILLIAM A. CONWAY, OF MUSKOGEE, OKLAHOMA.

PORTABLE CIRCULAR SAWING-MACHINE.

1,075,918.   Specification of Letters Patent.   Patented Oct. 14, 1913.

Application filed May 27, 1912. Serial No. 699,996.

*To all whom it may concern:*

Be it known that I, WILLIAM KAYLOR, a citizen of the United States, residing at Muskogee, in the county of Muskogee and State of Oklahoma, have invented certain new and useful Improvements in Portable Circular Sawing-Machines; and I do declare the following to be a full, clear, and exact description of the invention, such as will enable others skilled in the art to which it appertains to make and use the same.

This invention relates to improvements in sawing machines and more particularly to portable circular sawing machines having a reciprocating carriage.

One object of the invention is to provide a machine of this character having means whereby various sizes of natural logs or timbers may be cut without changing the position of the saws.

Another object is to provide means for protecting the idle saws while the timbers are being cut by the working saws, said means being mounted on the carriage of the machine within the planes of the outer saws and arranged to engage the slabs whose curved surfaces cannot cross said planes.

A further object is to provide an improved means for reciprocating the carriage for feeding the work to the saws.

With these and other objects in view, the invention consists of certain novel features of construction, and the combination and arrangement of parts as will be more fully described and claimed.

In the accompanying drawings, Figure 1 is a plan view of my improved sawing machine; Fig. 2 is a side view thereof; Fig. 3 is a front end view; Fig. 4 is an inverted plan view of the bed frame and table or carrier of the machine; Fig. 5 is a vertical longitudinal sectional view taken on the line 5—5 of Fig. 1; Fig. 6 is a similar view taken on the line 6—6 of Fig. 1; Fig. 7 is an enlarged cross sectional view taken on the line 7—7 of Fig. 1; Fig. 8 is a similar view taken on the line 8—8 of Fig. 1; Fig. 9 is an enlarged detail horizontal section taken on the line 9—9 of Fig. 3; Fig. 10 is a detail vertical sectional view of a portion of the table or carriage showing more clearly one of the saw protecting devices; Fig. 11 is a detail view of one of the saw protecting devices removed from the carriage; Fig. 12 is a detail perspective view of one of the deflecting devices for throwing the slabs away from the saw after being cut from the log; Fig. 13 is a detail sectional view of the log supporting table or carriage showing more particularly the manner in which the slabs are caught and prevented from falling on or interfering with the saws after being cut from the logs; Fig. 14 is a plan view of a slightly different form of the machine; Fig. 15 is a detail vertical sectional view taken on the line 15—15 of Fig. 14; Fig. 16 is a similar view taken on the line 16—16 of Fig. 14.

In the embodiment of the invention, I provide a main supporting frame comprising parallel side bars 1 which are connected at their ends by front and rear cross bars 2. The side and cross bars 1 and 2 are covered on their top and outer sides by angle iron covering plates 3. The main frame of the machine is supported by front and rear supporting wheels 4 and 5, said front wheels 4 being pivotally connected to the frame whereby the machine may be readily turned.

Secured to the side bars 1 of the main frame are longitudinally disposed right angularly formed table or carriage supporting plates 6 on the upper edges of which are inwardly projecting guide flanges 7 having in their inner edges longitudinally disposed guide grooves 8 with which are slidably engaged tongues 9 on the adjacent edges of the carriage or table 10 whereby the table is slidably supported and may be reciprocated to feed the work to the saws. In the table are arranged a plurality of saw receiving slots 11, 12, 13 and 14 with which are respectively engaged circular saws 15, 16, 17 and 18, said saws being fixed to a saw operating shaft or arbor 19 which is revolubly mounted in the plates 6 which support the carriage. One end of the shaft 19 projects beyond one side of the machine and has arranged thereon tight and loose pulleys 20 and 21 whereby the shaft may be driven from any suitable power. Secured in the rear ends of the saw engaging slots are slab spreading blades 22 which enter between the side of the log or timber and the slab being sawed therefrom, and prevent the slab from binding while being sawed.

The saw receiving slots of the table and the saws are spaced apart for cutting timbers of various sizes. The slots 11 and 12 and the saws 15 and 16 are preferably arranged to form an eight inch space between the same whereby timbers eight inches wide will be cut when engaged with said saws. The space between the slots 12 and 13 and the saws 16 and 17 is preferably sixteen inches in width, thus permitting timbers sixteen inches wide to be cut by the saws 16 and 17. The slots 13 and 14 and the saws 17 and 18 are preferably spaced six inches apart thereby permitting timbers of this width to be cut. By thus arranging the saws and the slots in the table it will be seen that timbers six, eight and sixteen inches square may be cut or timbers six by eight, six by sixteen or eight by sixteen inches may be cut by placing the timbers in the proper spaces between the saws. The spaces between the slots of the table are preferably depressed or hollowed out to a slight extent from the forward end of the table to a point near the saws as shown at 23 to provide rests for the logs to be sawed. Rigidly secured to the top of the table or carriage at the inner end of the log receiving rests are stops 24 having inwardly extending spurs with which the ends of the logs are engaged.

At the opposite end of the recesses 23 and near the front end of the table are upwardly projecting posts 25 having therein threaded apertures with which are engaged log clamping screws 26 having on their inner ends log engaging heads 27 provided with spurs whereby said heads are firmly engaged with the ends of the logs when clamped against the same by the screws 26. On the outer ends of the screws 26 are hand wheels 28 whereby the screws are operated. The log when engaged with the recesses 23 and clamped between the stops 24 and the heads 27 of the clamping screws will be firmly held in place while being fed to the saws by the movement of the table.

Adapted to be removably and adjustably secured to the table adjacent to the opposite sides of the saw receiving slots therein are slab deflecting lugs 29 which are preferably constructed as shown in Fig. 12 of the drawings and which are provided in their base portion with pairs of screw receiving slots 30 adapted to receive fastening screws whereby said lugs are detachably secured to the table of the machine in position to receive the slabs when sawed from the log thereby preventing the lower portion of the slabs from sliding beneath the log and interfering with the operation of the saws. Also removably and adjustably secured to the table adjacent to the inner edges of the outer saw slots 11 and 14 are saw protecting standards 31 which project upwardly a suitable distance and have on their lower ends right angular table engaging plates provided with slots 32 adapted to receive fastening screws 33 whereby said standards are adjustably and removably secured to the top of the table. The standards 31 are of the proper height and so proportioned as not to interfere with the placing of a larger log for action by a greater number of saws as clearly shown in Fig. 13 of the drawings. Two of the standards 31 are preferably provided for each of said slots and said standards are arranged near the opposite ends of the recesses 23 in which the logs rest and when so arranged the standards serve to prevent the slabs when sawed from the log from falling outwardly onto the outer saws 15 and 18. The arrangement and operation of the deflecting lugs 29 and the saw protecting standards 31 is clearly illustrated in full and dotted lines in Fig. 13 of the drawings.

The table or carriage 10 is reciprocated to bring the log thereon into engagement with the saws by a cable 34 which is connected at its inner end to the rear end of the table as shown at 35 and has its opposite end engaged with a winding drum or pulley of the machine operating motor (not shown). The table or carriage 10 is shifted in the opposite direction or returned to its original position by a cable 36 which is connected thereto as at 37 and which passes around a guide pulley 38 mounted in a suitable bracket on the forward end of the table supporting frame below the table and from said pulley extends rearwardly and is operatively connected with a suitable pulley or winding drum on the engine or motor of the machine. The cable 36 passes through a suitable passage 39 in the cross bar 40 of the inner end of the table supporting frame as shown. The carriage is limited in its rearward movement by the engagement of a bumper 41 secured to a bracket on the lower side of the table with a similar bumper 42 arranged on the cross bar 40 of the frame and the table 10 is stopped on its return movement by bumpers 43 arranged in brackets secured to the inner sides of the table supporting plates 6 adjacent to the front end of the machine and which are disposed in the path of movement of stop lugs 44 projecting downwardly from the lower side of the carriage or table as clearly shown in Fig. 5 of the drawings.

In order to facilitate the placing of the logs on the machine and the removal of the sawed timbers therefrom, I provide suitable log raising and lowering devices comprising plates 45 to the ends of which are connected operating cables 46 which pass upwardly around guide pulleys 47 in the upper ends of cranes 48 secured to the plates 6 and main supporting frame of the wagon as shown. The cables 46 after passing over the pulleys 47 extend downwardly through suitable passages in the flanges 7 of the plates 6 and are engaged with guide pulleys 49 revolubly mounted on the inner sides of the plates 6. The cables 46 after passing around the pulleys 49 have their ends engaged with the opposite sides of cable winding drums 50 which are revolubly mounted on the inner sides of the plates 6 whereby when said drums are operated in one direction, said cables will be wound thereon and when operated in the opposite direction will be unwound therefrom thereby raising and lowering the log receiving plates 45. The drums 50 have fixedly mounted thereon or formed integral therewith operating pulleys 51 with which are engaged cables 52 the ends of which extend rearwardly from the machine and are engaged with a suitable operating mechanism on the engine or motor of the machine. By providing hoisting devices constructed as herein shown and described it will be seen that large logs may be readily raised to the level of the table or carriage and when brought to this level may be rolled from the plates 45 of the hoisting devices onto laterally projecting shelves 53 arranged on and projecting from the plates 6 of the machine in position to receive the logs. After the logs have been sawed the timbers may be removed from the table or carriage to the plates 45 of the hoisting devices and by means of the latter easily lowered to the ground.

In Figs. 14, 15 and 16 of the drawings is shown a slightly modified construction and arrangement of the log supporting table or carriage whereby the saw 15 may be shifted for the purpose of cutting twelve inch timbers. In order to permit this additional size timber to be cut the table 10 is provided with an additional saw receiving slot 54 which is spaced four inches from the slot 11. The portion of the table between the saw 15 and the adjacent end of the slot 54 is made removable so that when it is desired to cut twelve inch timbers, this portion of the table is removed and the saw 15 shifted on the shaft 19 until brought into alinement with the slot 54 in the table after which the space between the saw and the slot 11 is closed by a removable plate 55 which is supported by flanges 56 formed on the table at the ends of the space cut therein to permit the shifting of the saw. The machine when constructed to provide for the cutting of additional size timbers is constructed wider than the machine previously described for cutting six sizes of timbers and in the machine cutting the additional sized timbers.

The operating parts of the machine may be connected with a traction engine or any other suitable motor (not shown) whereby these parts are driven in the proper direction and the machine is preferably secured to the engine or motor and firmly held by connecting bars 57 secured to the rear end of the plates 6 of the frame and to the engine or motor.

While my improved sawing machine may be employed for cutting any kinds of timbers, the same is particularly designed for sawing railroad ties and the like.

Having thus described my invention, what I claim is;

A machine for sawing natural logs and determining the number of cuts according to the size of a log, comprising a supporting frame, a work supporting carriage mounted to travel on said frame and having therein longitudinally disposed slots to receive the saws, means to hold the work in place on the carriage by engaging its end faces, and means on the carriage within the planes of the outer saws arranged to engage a slab whose curved surface does not cross said plane and prevent it from falling onto or interfering with said outer saws, such means being so proportioned as not to interfere with the placing of a larger log for action by a greater number of saws.

In testimony whereof I have hereunto set my hand in presence of two subscribing witnesses.

WILLIAM KAYLOR.

Witnesses:
A. D. CRUSER,
A. M. BRADLEY.

---

Copies of this patent may be obtained for five cents each, by addressing the "Commissioner of Patents, Washington, D. C."